Oct. 14, 1924. 1,511,419
F. B. MALLORY
BLOCK
Filed Oct. 26, 1920 2 Sheets-Sheet 1
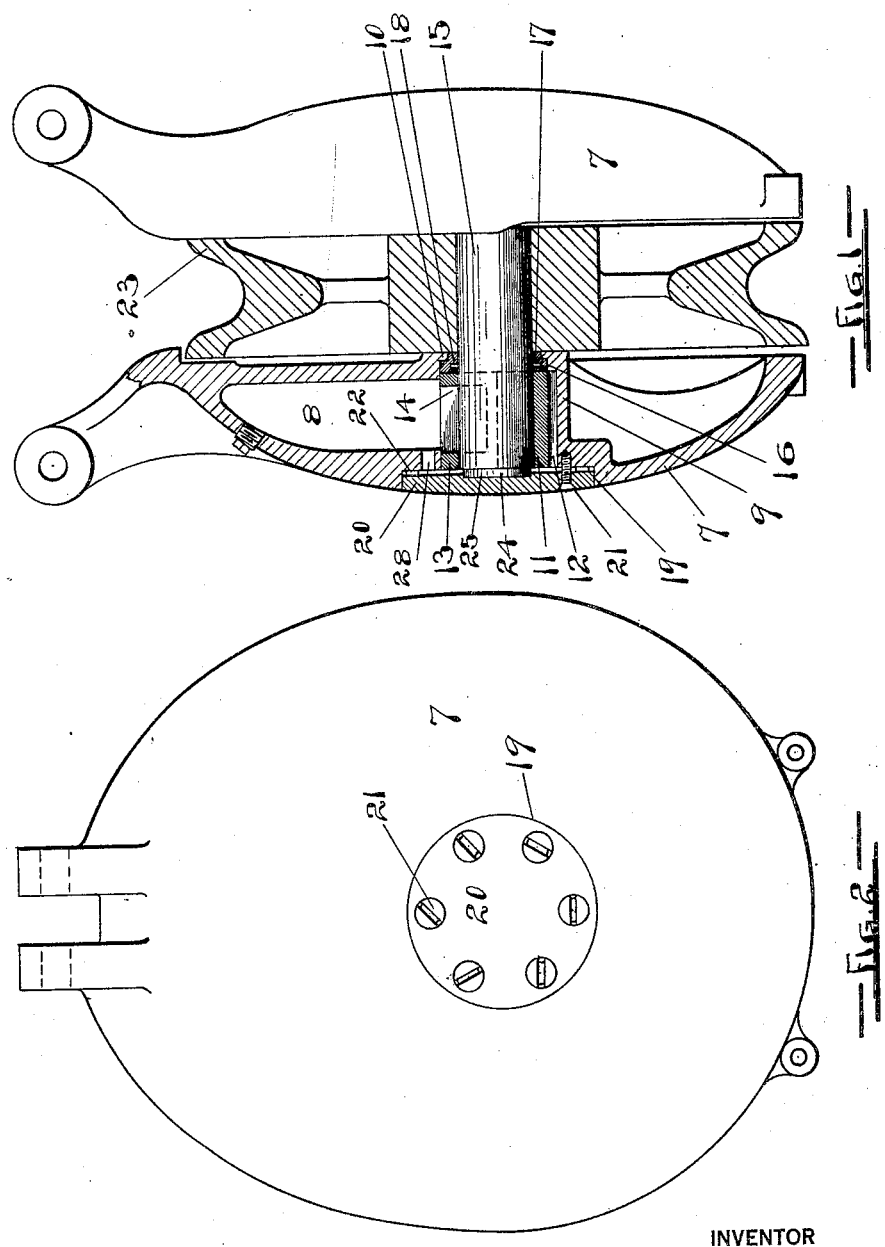
INVENTOR
FREDERICK B. MALLORY
BY
C. F. Blake
ATTORNEY Oct. 14, 1924.

F. B. MALLORY

BLOCK

Filed Oct. 26, 1920

INVENTOR
FREDERICK B MALLORY
BY
C. F. Blake
ATTORNEY

Patented Oct. 14, 1924.

1,511,419

UNITED STATES PATENT OFFICE.

FREDERICK B. MALLORY, OF PORTLAND, OREGON.

BLOCK.

Application filed October 26, 1920. Serial No. 419,611.

*To all whom it may concern:*

Be it known that I, FREDERICK B. MALLORY, a citizen of the United States, residing at Portland, county of Multnomah, State of Oregon, have invented certain new and useful Improvements in Blocks, of which the following is a specification.

My invention relates to blocks in general, and particularly to rope and chain blocks such as are used in logging and like operations, the object being to provide a block of extreme simplicity and strength, and also a block having improved lubrication facilities.

I accomplish the above objects by means of the construction illustrated in the accompanying drawings, which are a part of this application for Letters Patent, like characters of reference indicating like parts throughout the several views thereof, and in which:

Fig. 1 is an end elevation of a block embodying my invention, parts being broken away to illustrate the construction.

Fig. 2 is a side elevation of the subject matter of Fig. 1.

Figure 3:
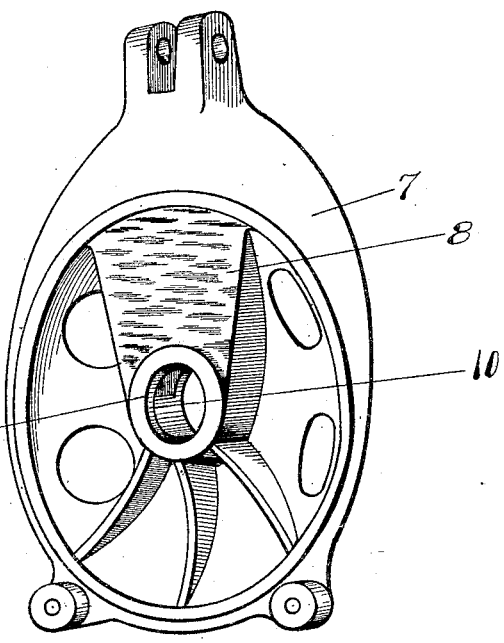
Fig. 3 is a perspective view of one of the block sides showing the inner surface thereof.
Figure 4:
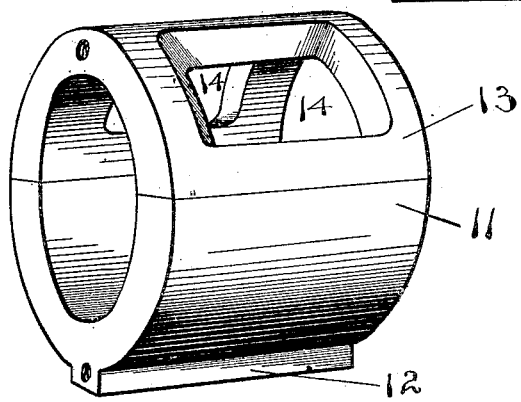
Fig. 4 is a perspective view of the sheave pin bushing.

In the preferred form illustrated in the drawings, my device consists of a pair of block sides 7 having an outwardly convex smooth contour, and each having a lubricant chamber formed integral therewith upon the inner side thereof, said lubricant chambers being designated by 8, and each of said lubricant chambers opening into the hub 9 of the block side, as shown in Figs. 1 and 3.

The hubs 9 of the block sides are bored cylindrical from the outside thereof to receive a bushing, and an annular flange 10 is provided upon the inner end of said hubs 9 to contact with a retaining collar.

The sleeve pin bushing is formed in halves, the lower half 11 having thereon a gib or feather 12 adapted to enter a suitable slot in the bore of the hub 9 and thus prevent the bushing from rotating. The upper portion of the bushing 13 is provided with suitable orifices 14 therein, which orifices register with the openings of the lubricant chamber into the hubs 9 and thus provide a means of the lubricant within said chamber coming into contact with the sheave pin 15, as shown in Fig. 1.

Figure 5:
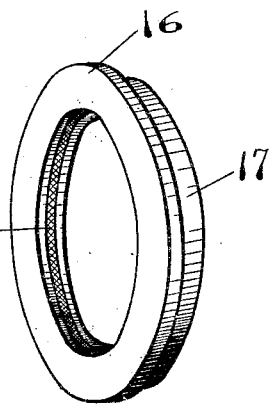
Fig. 5 is a perspective view of the retaining collar.

To prevent the lubricant from leaking out at the inner ends of the hubs 9 I provide a retaining collar with a flange 16 of substantially the same diameter as the bushings 11 and 13 and having a portion of reduced diameter fitting within the flange 10 of the hubs 9, said portion being designated by 17, as shown in Figs. 1 and 5. A groove is provided upon the inner peripheral face of said collar and is packed with felt 18 or other suitable material, to bear upon the sheave pin 15 and thus prevent leakage of lubricant past the collar. The retaining collar is secured in place by the flange 10 and the bushings 11 and 13, as shown in Fig. 1.

To inclose the sheave pin bearings in a dirt proof manner a counterbore 19 is provided in the outer face of each block side concentric with the bore of the hub 9, and a cap 20 is fitted within said counterbore and secured therein by suitable screws 21. The cap 20 serves to retain the bushing in position, and also to center and hold in position the end thrust washers 24, which will later be described.

To prevent leakage of lubricant past said caps 20 I insert a band of felt, or other suitable packing material, between the cap 20 and the block side 7, as shown at 22 in Fig. 1.

Figure 6:
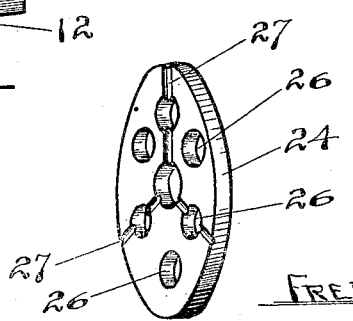
Fig. 6 is a perspective view of the thrust washer.

In blocks of ordinary construction there has always developed a heavy pressure between the hubs of the sheave and of the block sides, and to prevent this I secure the sheave 23 to the shaft 15 in any suitable manner, as by a simple press fit therebetween as shown in Fig. 1, and provide thrust washers 24 disposed within a counterbore 25 upon the inner side of the cap 20, against which washer the end of the shaft 15 bears, as shown in Fig. 1. Each thrust washer is provided with lubricant orifices 26 and lubricant channels 27, as shown in Fig. 6, and lubricant enters therein by way of an orifice 28 communicating from lubricant chamber 8 to the space formed between the block side 7 and the cap 20 by the packing 22, as shown in Fig. 1.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a sheave block, side plates, bearings formed on said plates, each plate having a lubricant reservoir positioned substantially entirely above said bearing, and opening at its bottom directly into the bearing, a removable bushing in said bearing, said bushing having an opening registering with the opening between said reservoir and the bearing, and a sheave having journals in said bushings whereby the bushings and journals serve as bottoms for said reservoirs and there is a direct gravity feed between the reservoirs and the journals.

2. In a sheave block, side plates, bearings formed on said plates, each plate having a lubricant reservoir positioned substantially entirely above said bearing, and opening at its bottom directly into the bearing, a key-way on the base of said bearing, a removable bushing in said bearing having a key fitted into said key-way, said bushing having an opening registering with the opening between said reservoir and the bearing, and a sheave having journals in said bushings whereby the bushings and journals serve as bottoms for said reservoirs and there is a direct gravity feed between the reservoirs and the journals.

3. In a sheave block, side plates, bearings formed on said plates, each plate having a lubricant reservoir positioned substantially entirely above said bearing, and opening at its bottom directly into the bearing, a removable bushing in said bearing, said bushing and bearing having a cooperating key and key-way to prevent rotary movement of the bushing in the bearing and said bushing having an opening registering with the opening between said reservoir and the bearing, and a sheave having journals in said bushings whereby the bushings and journals serve as bottoms for said reservoirs and there is a direct gravity feed between the reservoirs and the journals.

4. In a sheave block, side plates, bearings formed on said plates, each plate having a lubricant reservoir opening into said bearing, a removable bushing in each bearing having an opening therein, a sheave between said plates, a shaft upon which said sheave is fixed and having its ends projecting into said bushings, end thrust bearing members in the longitudinal lines of said shaft and at the ends of the same, said members being removable and being positioned to receive lubricant from said reservoir, each plate having a passage therein leading directly to said thrust member and independently of the opening into said bearing, and a removable cap on each plate serving to maintain said thrust member and the bushing in position.

In witness whereof I claim the foregoing as my own I hereunto affix my signature in the presence of two witnesses at Portland, county of Multnomah, State of Oregon, this 21st day of Oct. 1920.

FREDERICK B. MALLORY.

Witnesses:
C. F. BLAKE,
L. J. ROBINSON.